(12) United States Patent
Zhao (10) Patent No.: US 10,699,431 B2
(45) Date of Patent: Jun. 30, 2020

(54) METHOD AND APPARATUS FOR GENERATING IMAGE GENERATIVE MODEL

(71) Applicant: Baidu Online Network Technology (Beijing) Co., Ltd., Beijing (CN)

(72) Inventor: Chen Zhao, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 120 days.

(21) Appl. No.: 16/169,293

(22) Filed: Oct. 24, 2018

(65) Prior Publication Data

US 2019/0304118 A1      Oct. 3, 2019

(30) Foreign Application Priority Data

Mar. 27, 2018   (CN) .......................... 2018 1 0259506

(51) Int. Cl.
*G06T 7/593* (2017.01)
*G06N 3/08* (2006.01)

(52) U.S. Cl.
CPC ............. *G06T 7/593* (2017.01); *G06N 3/084* (2013.01); *G06T 2207/20081* (2013.01)

(58) Field of Classification Search
CPC ........... G06T 7/593; G06T 2207/20081; G06T 2207/10024; G06T 2207/10028; G06T 2207/20084; G06T 7/55; G06T 17/00; G06N 3/084; G06N 3/0454; G06K 9/6215
See application file for complete search history.

*Primary Examiner* — Christopher Wait
(74) *Attorney, Agent, or Firm* — Knobbe, Martens, Olson & Bear, LLP (57) ABSTRACT

Methods and apparatuses for generating an image generative model are disclosed. An embodiment comprises: acquiring a sample set, a sample comprising a first depth image, a second depth image and a visible image; and executing training based on the sample set: inputting the second depth image and the visible image of at least one sample in the sample set respectively into a pre-established initial neural network model to obtain a generated depth image corresponding to each of the at least one sample; calculating a similarity between the generated depth image corresponding to the each of the at least one sample and a corresponding first depth image; determining whether the initial neural network model reaches a preset optimization goal based on the calculation result; and using the initial neural network model as the trained image generative model, in response to determining the initial neural network model reaching the preset optimization goal.

11 Claims, 5 Drawing Sheets

METHOD AND APPARATUS FOR GENERATING IMAGE GENERATIVE MODEL

CROSS-REFERENCE TO RELATED APPLICATIONS

This application claims priority to Chinese Patent Application No. 201810259506.2, filed in China on Mar. 27, 2018, the content of which is incorporated herein by reference in its entirety.

TECHNICAL FIELD

Embodiments of the disclosure relate to the field of computer technology, and specifically to a method and apparatus for generating an image generation model.

BACKGROUND

At the present stage, the image or video captured by the camera can record the color projection of the real world on a two-dimensional plane, but fails to reflect the three-dimensional structure of a real scenario. The depth image can show depth of each point in the scenario, i.e., each pixel in the depth image records the distance from one certain point in the scenario to the XY plane on which the center of the camera located. The depth image has very wide applications in the field of 3D measurement and man-machine interaction. At present, depth images of the scenario can be acquired by the depth camera.

SUMMARY

Embodiments of the disclosure present a method and apparatus for generating an image generation model.

In a first aspect, an embodiment of the disclosure provides a method for generating an image generative model. The method includes: acquiring a sample set, a sample including a first depth image, a second depth image, and a visible image, the first depth image, the second depth image, and the visible image including information of a given scenario, image resolutions of the first depth image and the visible image being higher than a preset first resolution threshold, an image resolution of the second depth image being lower than a preset second resolution threshold; and executing following training based on the sample set: inputting a second depth image and a visible image of at least one sample in the sample set respectively into a pre-established initial neural network model to obtain a generated depth image corresponding to each of the at least one sample; calculating a similarity between the generated depth image corresponding to the each of the at least one sample and a corresponding first depth image; determining whether the initial neural network model reaches a preset optimization goal based on the calculation result; and using the initial neural network model as the trained image generative model, in response to determining the initial neural network model reaches the preset optimization goal.

In some embodiments, the method further includes: adjusting a model parameter of the initial neural network model, and forming a sample set including unused samples to continue executing the training, in response to determining the initial neural network model fails to reach the preset optimization goal.

In some embodiments, samples in the sample set are obtained by following: acquiring a first sample depth image of a sample scenario, where an image resolution of the first sample depth image is higher than the first resolution threshold; processing the first sample depth image to obtain a second sample depth image, where an image resolution of the second sample depth image is lower than the second resolution threshold; acquiring a sample visible image of the sample scenario, where an image resolution of the sample visible image is higher than the first resolution threshold; and storing associatively the first sample depth image, the second sample depth image, and the sample visible image as the sample in the sample set.

In some embodiments, the acquiring a first sample depth image of a sample scenario includes: acquiring at least two visible images of the sample scenario collected by an image acquisition device from different angles, where an image resolution of a visible image in the at least two visible images is higher than the first resolution threshold; and obtaining the first sample depth image of the sample scenario based on the at least two visible images.

In some embodiments, the method further includes: receiving a to-be-processed depth image and a to-be-used visible image, where the to-be-processed depth image and the to-be-used visible image include information of a given scenario, an image resolution of the to-be-processed depth image is lower than the second resolution threshold, and an image resolution of the to-be-used visible image is higher than the first resolution threshold; and introducing the to-be-processed depth image into the image generative model to obtain a processed depth image.

In a second aspect, an embodiment of the disclosure provides an apparatus for generating an image generative model. The apparatus includes: an acquisition unit for acquiring a sample set, a sample including a first depth image, a second depth image, and a visible image, the first depth image, the second depth image, and the visible image including information of a given scenario, image resolutions of the first depth image and the visible image being higher than a preset first resolution threshold, an image resolution of the second depth image being lower than a preset second resolution threshold; and a training unit for executing following training based on the sample set: inputting a second depth image and a visible image of at least one sample in the sample set respectively into a pre-established initial neural network model to obtain a generated depth image corresponding to each of the at least one sample; calculating a similarity between the generated depth image corresponding to the each of the at least one sample and the corresponding first depth image; determining whether the initial neural network model reaches a preset optimization goal based on the calculation result; and using the initial neural network model as the trained image generative model, in response to determining the initial neural network model reaches the preset optimization goal.

In some embodiments, the apparatus further includes: an adjusting unit for adjusting a model parameter of the initial neural network model, and forming a sample set including unused samples to continue executing the training, in response to determining the initial neural network model fails to reach the preset optimization goal.

In some embodiments, the apparatus further includes a sample generation unit. The sample generation unit includes: a depth image acquisition unit for acquiring a first sample depth image of a sample scenario, where an image resolution of the first sample depth image is higher than the first resolution threshold; a processing unit for processing the first sample depth image to obtain a second sample depth image, where an image resolution of the second sample depth image is lower than the second resolution threshold; a visible image acquisition unit for acquiring a sample visible image of the sample scenario, where an image resolution of the sample visible image is higher than the first resolution threshold; and a storage unit for storing associatively the first sample depth image, the second sample depth image, and the sample visible image as a sample in the sample set.

In some embodiments, the depth image acquisition unit is further used for: acquiring at least two visible images of the sample scenario collected by an image acquisition device from different angles, where an image resolution of a visible image in the at least two visible images is higher than the first resolution threshold; and obtaining the first sample depth image of the sample scenario based on the at least two visible images.

In some embodiments, the apparatus further includes: a receiving unit for receiving a to-be-processed depth image and a to-be-used visible image, where the to-be-processed depth image and the to-be-used visible image include information of a given scenario, an image resolution of the to-be-processed depth image is lower than the second resolution threshold, and an image resolution of the to-be-used visible image is higher than the first resolution threshold; and an introduction unit for introducing the to-be-processed depth image into the image generative model to obtain a processed depth image.

In a third aspect, an embodiment of the disclosure provides a device. The device includes: one or more processors; and a memory for storing one or more programs. The one or more programs enable, when executed by the one or more processors, the one or more processors to implement the method according to any one of the implementations in the first aspect.

In a fourth aspect, an embodiment of the disclosure provides a computer readable medium storing a computer program therein. The computer program implements, when executed by a processor, the method according to any one of the implementations in the first aspect.

The method and apparatus for generating an image generative model according to the embodiments of the disclosure first acquire a sample set, and then execute following training based on the sample set: inputting a second depth image and a visible image of at least one sample in the sample set respectively into a pre-established initial neural network model to obtain a generated depth image corresponding to each of the at least one sample; calculating a similarity between the generated depth image corresponding to the each of the at least one sample and the corresponding first depth image; determining whether the initial neural network model reaches a preset optimization goal based on the calculation result; and using the initial neural network model as the trained image generative model, in response to determining the initial neural network model reaching the preset optimization goal, thereby achieving generating the image generative model, calculating the similarity between the generated depth image corresponding to the each sample and the corresponding first depth image in a process of training the image generative model, and determining whether the initial neural network model reaches the preset optimization goal based on the calculation result. Therefore, some embodiments of the disclosure can guarantee the trained image generative model being capable of generating a high-resolution and high-quality depth image.

BRIEF DESCRIPTION OF THE DRAWINGS

By reading and referring to detailed description on the non-limiting embodiments in the following accompanying drawings, other features, objects and advantages of the disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
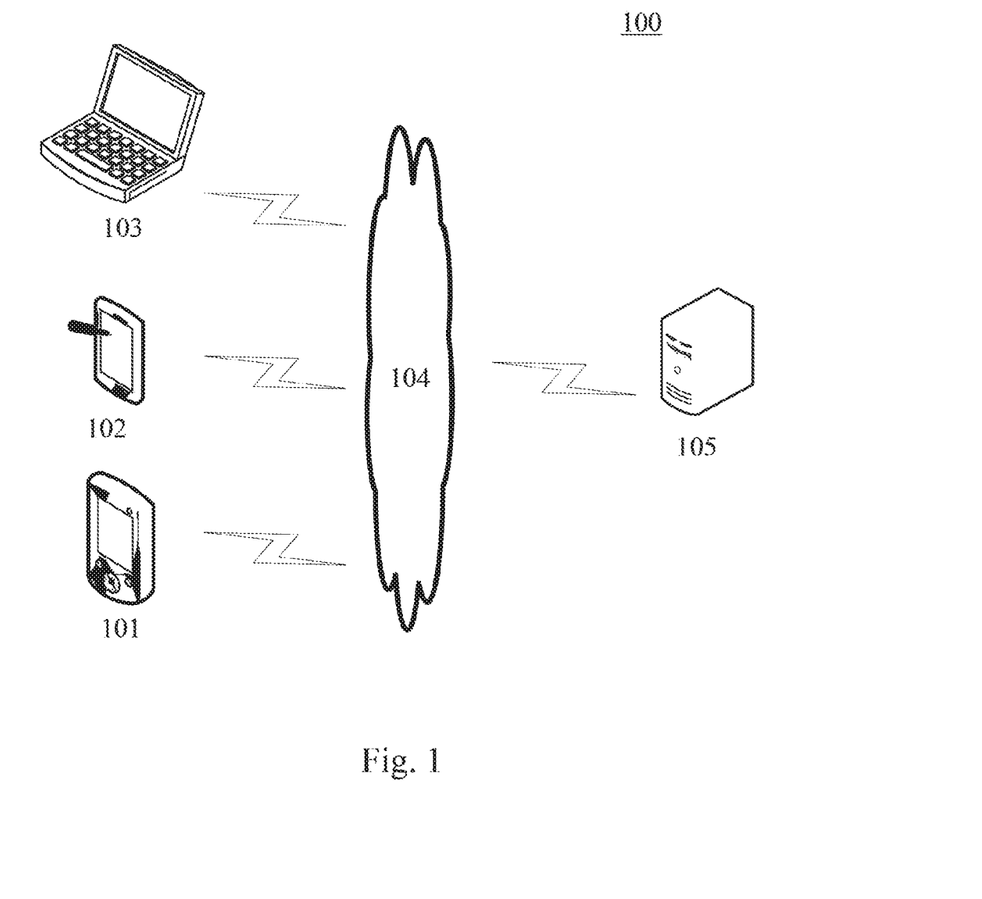
FIG. 1 is a structural diagram of an illustrative system in which some embodiments of the disclosure may be applied.

FIG. 1 shows an exemplary architecture of a system 100 in which a method for generating an image generative model or an apparatus for generating an image generative model according to the embodiments of the present disclosure.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user 110 may use the terminal devices 101, 102 and 103 to interact with the server 105 through the network 104, in order to transmit or receive messages, etc. Various communication client applications, such as camera applications, image processing applications, search applications may be installed on the terminal devices 101, 102 and 103.

The terminal devices 101, 102 and 103 may be hardware or software. When the terminal devices 101, 102 and 103 are hardware, the terminal devices 101, 102 and 103 may be various electronic devices including a display screen and supporting of the training of the image generative model, including but not limited to, smart phones, tablet computers, laptop computers and desktop computers. When the terminal devices 101, 102 and 103 are software, the terminal devices 101, 102 and 103 may be installed on the above-listed electronic devices. They may be implemented as a plurality of software or software module (e.g. for providing distributed service), or may be implemented as a single software or a single software module, and here it is not specifically restricted.

The server 105 may be a server providing various services, for example, a backend server providing supporting for the images or graphics displayed on the terminal devices 101, 102 or 103. The backend server may perform a corresponding processing on the received data (e.g. image data), and return a processing result to the terminal devices.

It should be noted that the method for generating an image generative model according to the embodiments of the present disclosure may be executed by the terminal devices 101, 102 or 103, or may be executed by the server 105, or may also be implemented by the terminal devices 101, 102 or 103 and the server 105 jointly. Accordingly, the apparatus for generating an image generative model may be installed on the server 105, or may be installed on the terminal devices 101, 102 or 103, or some units are installed on the server 105 while the other units are installed on the terminal devices 101, 102 or 103. It is not restricted in the present disclosure.

It should be noted that, the server may be a hardware or a software. When the server is a hardware, it may be implemented as a distributed server cluster including a plurality of servers, or it may also be implemented as a single server. When the server is software, it may be implemented as a plurality of software or software modules, or it may also be implemented as a single software or a single software module, which is not restricted here.

It should be appreciated that the numbers of the terminal devices, the networks and the servers in FIG. 1 are merely illustrative. Any number of terminal devices, networks and servers may be provided based on the actual requirements.

Figure 2:
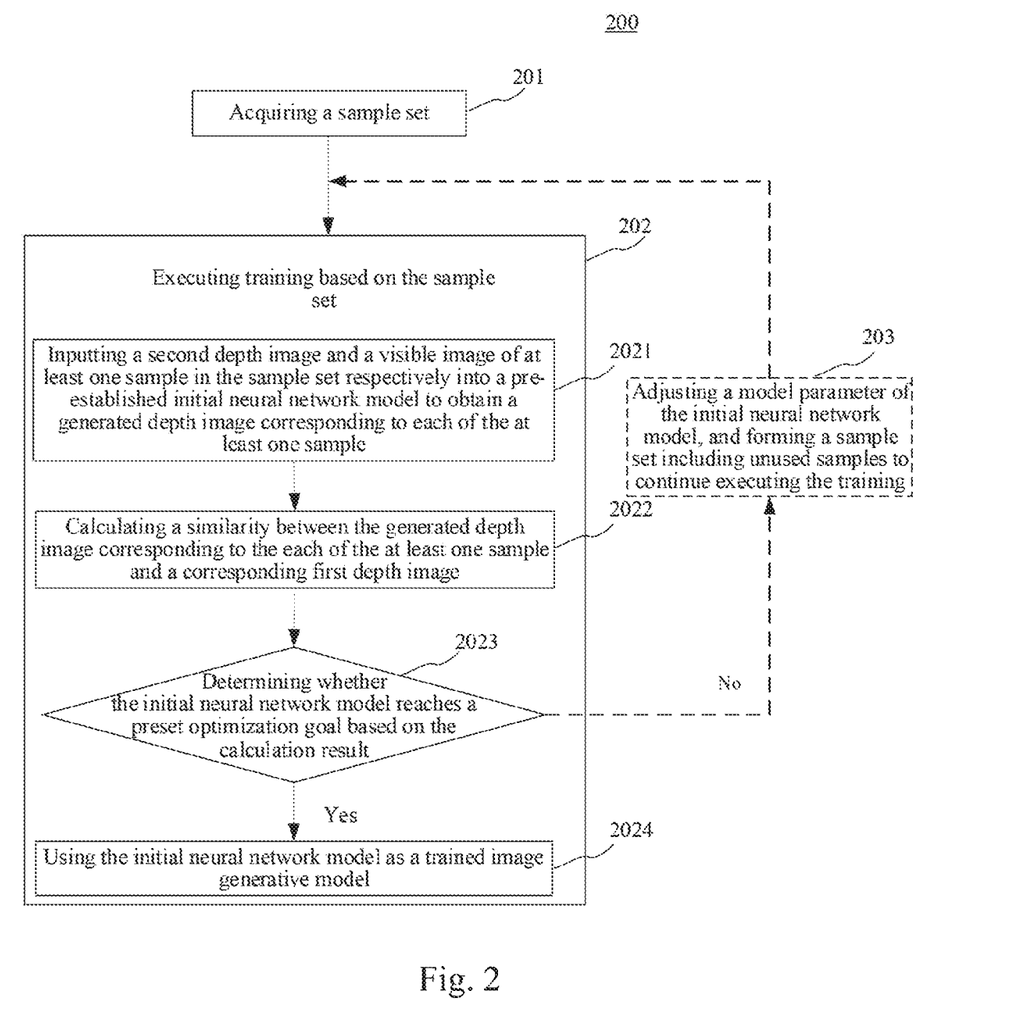
FIG. 2 is a process diagram of an embodiment of a method for generating an image generation model according to the disclosure.

Please further refer to FIG. 2, which shows a flow 200 of an embodiment of a method for generating an image generative model according to some embodiments of the disclosure. The method for generating an image generative model includes:

step 201: acquiring a sample set.

In the embodiment, an executive subject (e.g., the terminal devices 101, 102, 103, or the server 105 shown in FIG. 1) of the method for generating an image generative model can acquire a sample set. A sample in the sample set may include a first depth image, a second depth image, and a visible image. The first depth image, the second depth image, and the visible image include information of a given scenario. Here, the scenario may include a variety of photographing objects, such as human faces, human bodies, and objects. For example, the first depth image, the second depth image, and the visible image may include facial information of a given human face. Image resolutions of the first depth image and the visible image are higher than a preset first resolution threshold, and an image resolution of the second depth image is lower than a preset second resolution threshold. Here, the visible image may be an RGB image (i.e., an image in an RGB color mode). The first resolution threshold and the second resolution threshold may be set based on actual needs.

In some optional implementations of the embodiment, samples in the sample set may be obtained by following:

First, the executive subject can acquire a first sample depth image of a sample scenario, where an image resolution of the first sample depth image is higher than the first resolution threshold. Here, the sample scenario may include a variety of photographing objects, such as human faces, human bodies, and objects.

Then, the executive subject can process the first sample depth image variously to obtain a second sample depth image. An image resolution of the second sample depth image is lower than the second resolution threshold. As an example, the executive subject can downsample the first sample depth image to obtain a second sample depth image having an image resolution lower than the second resolution threshold.

Then, the executive subject can acquire a sample visible image of the sample scenario. An image resolution of the sample visible image is higher than the first resolution threshold. As an example, the sample scenario can be photographed using an image sensor (such as a camera) to obtain a sample visible image (such as an RGB image). Then, the executive subject can acquire the sample visible image from the image sensor.

Finally, the executive subject can associatively store the first sample depth image, the second sample depth image, and the sample visible image as a sample in the sample set.

In some optional implementations, the acquiring a first sample depth image of a sample scenario may specifically include:

First, the executive subject can acquire at least two visible images of the sample scenario collected by an image acquisition device from different angles. An image resolution of each visible image of the at least two visible images is higher than the first resolution threshold. As an example, the at least two visible images of a sample scenario can be collected by a single or a plurality of image acquisition devices (such as cameras) from different angles. It should be noted that the single or the plurality of image acquisition devices need to photograph the sample scenario in same orientation when collecting images of the sample scenario, and the angle of each photographing shall be less than or equal to a preset angle threshold.

Then, the executive subject can obtain the first sample depth image of the sample scenario based on the at least two visible images. As an example, the executive subject can first perform stereo matching on the at least two visible images to generate parallax information, and then obtain the first sample depth image of the sample scenario based on the parallax information.

Stereo matching, also known as parallax estimation, means to estimate a geometrical relationship between pixel points in a corresponding image based on a multi-view image acquired by the camera. Based on information of one viewpoint and depth (parallax) information thereof, information of the corresponding viewpoint can be obtained using parallax estimation. According to different specific implementation details, the stereo matching algorithm may be roughly divided into a local stereo matching algorithm and a global stereo matching algorithm. The stereo matching algorithm is a well-known technology, which is widely researched and applied at present, and is not repeated any more here.

step 202: executing training based on the sample set.

In the embodiment, the executive subject can execute following training based on the sample set. The training may specifically include:

step 2021: inputting a second depth image and a visible image of at least one sample in the sample set respectively into a pre-established initial neural network model to obtain a generated depth image corresponding to each of the at least one sample.

In the embodiment, the executive subject can input a second depth image and a visible image of at least one sample in the sample set respectively into a pre-established initial neural network model to obtain a generated depth image corresponding to the each of the at least one sample. Here, the initial neural network model can be used for characterizing a corresponding relationship between the depth image and the visible image and the generated depth image. As an example, the initial neural network model may be a convolutional neural network, a deep neural network, and so on.

step 2022: calculating a similarity between the generated depth image corresponding to the each of the at least one sample and a corresponding first depth image.

In the embodiment, the executive subject can calculate a similarity between the generated depth image corresponding to the each of the at least one sample and the corresponding first depth image. Here, the similarity may include, but is not limited to, a cosine similarity, a Jaccard similarity coefficient, a Euclidean distance, and so on.

step 2023: determining whether the initial neural network model reaches a preset optimization goal based on the calculation result.

In the embodiment, the executive subject can determine whether the initial neural network model reaches a preset optimization goal based on the calculation result in the step 2022. As an example, the optimization goal may be a calculated similarity is less than a preset similarity threshold. As another example, when a similarity between a generated depth image and a corresponding first depth image reaches a preset threshold, it is considered that the generated depth image is accurate. In this case, the optimization goal may refer to an accuracy rate of generating the generated depth image by the initial neural network model being greater than a preset accuracy rate threshold.

step 2024: using the initial neural network model as a trained image generative model, in response to determining the initial neural network model reaches the preset optimization goal.

In the embodiment, the executive subject can use the initial neural network model as a trained image generative model, in response to determining the initial neural network model reaches the preset optimization goal. It should be noted that after generating the image generative model, the executive subject can distribute the image generative model to other electronic devices, to enable the other electronic device to use the image generative model for image processing.

In some optional implementations of the embodiment, the method for generating an image generative model may further include:

step 203: adjusting model parameters of the initial neural network model, and forming a sample set including unused samples to continue the training, in response to determining the initial neural network model fails to reach the preset optimization goal.

In the embodiment, the executive subject can adjust model parameters of the initial neural network model, and form a sample set including unused samples to continue the training, in response to determining the initial neural network model fails to reach the preset optimization goal. As an example, the executive subject can adjust the model parameters of the initial neural network model using a back-propagation algorithm (BP algorithm) and a gradient descent method (e.g., a stochastic gradient descent algorithm). It should be noted that the back-propagation algorithm and the gradient descent method are well-known technologies that are widely researched and applied at present, and are not repeated any more here.

Figure 3:
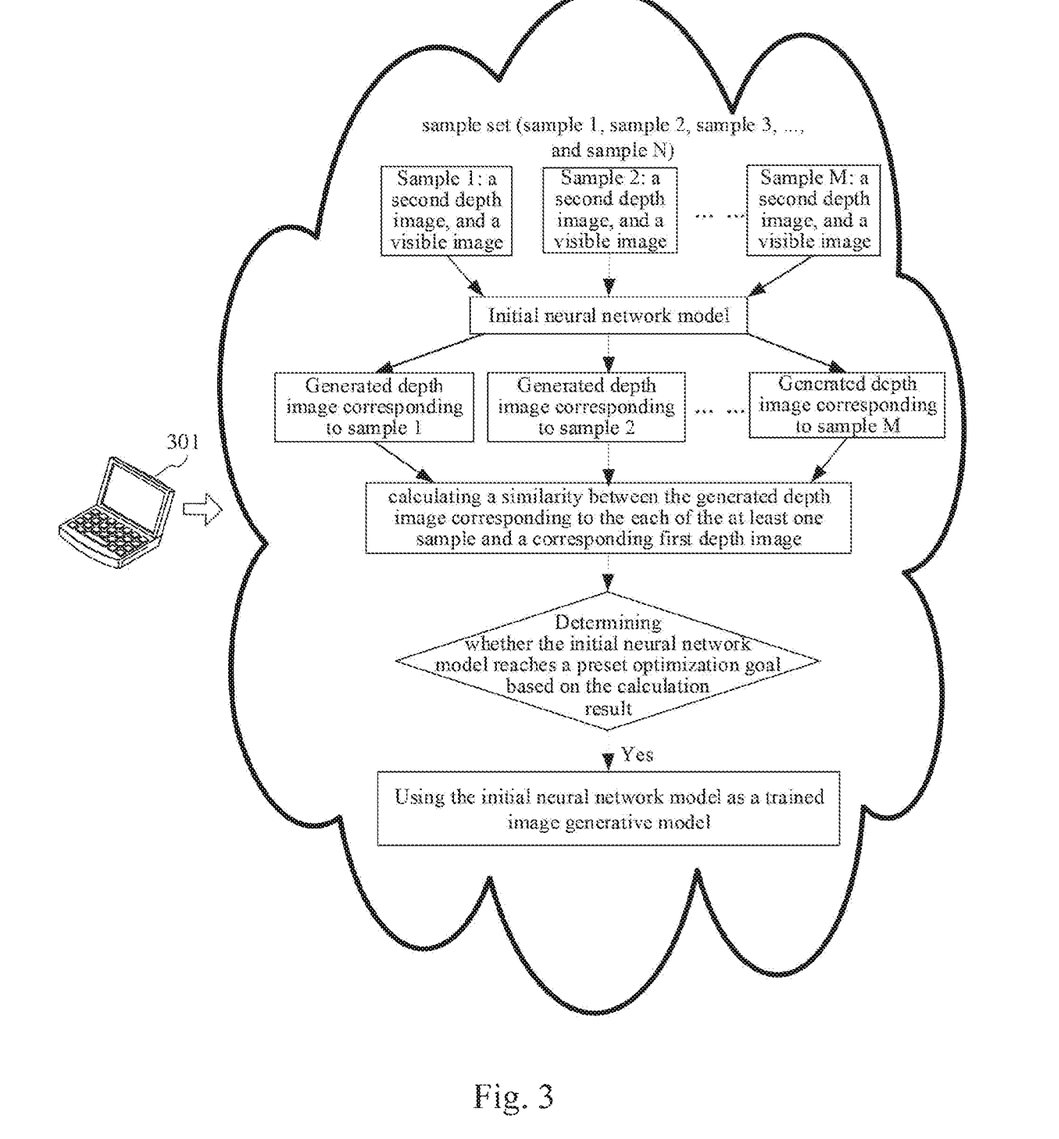
FIG. 3 is a schematic diagram of an application scenario of a method for generating an image generation model according to some embodiments of the disclosure.

Please further refer to FIG. 3. FIG. 3 is a schematic diagram of an application scenario of a method for generating an image generation model according to an embodiment. In the application scenario of FIG. 3, a terminal device 301 first acquires a sample set. The sample set includes sample 1, sample 2, sample 3, . . . , and sample N. A sample in the sample set include a first depth image, a second depth image, and a visible image. The first depth image, the second depth image, and the visible image include facial information of a given person. Image resolutions of the first depth image and the visible image are higher than a preset first resolution threshold, and an image resolution of the second depth image is lower than a preset second resolution threshold. Then, the terminal device 301 executes following training based on the sample set: step S1: inputting a second depth image and a visible image of at least one sample (e.g., the sample 1, the sample 2, . . . , and the sample M) in the sample set respectively into a pre-established initial neural network model to obtain a generated depth image corresponding to each of the at least one sample. step S2: calculating a similarity between the generated depth image corresponding to the each of the at least one sample and a corresponding first depth image. step S3: determining whether the initial neural network model reaches a preset optimization goal based on the calculation result. step S4: using the initial neural network model as a trained image generative model, in response to determining the initial neural network model reaches the preset optimization goal.

The method according to the embodiment of the disclosure achieves generating an image generative model. In the process of training the image generation model, a similarity between a generated depth image corresponding to a sample and a corresponding first depth image is calculated, and whether the initial neural network model reaches a preset optimization goal based on the calculation result is determined, and therefore the trained image generative model being capable of generating a high-resolution and high-quality depth image can be guaranteed.

Figure 4:
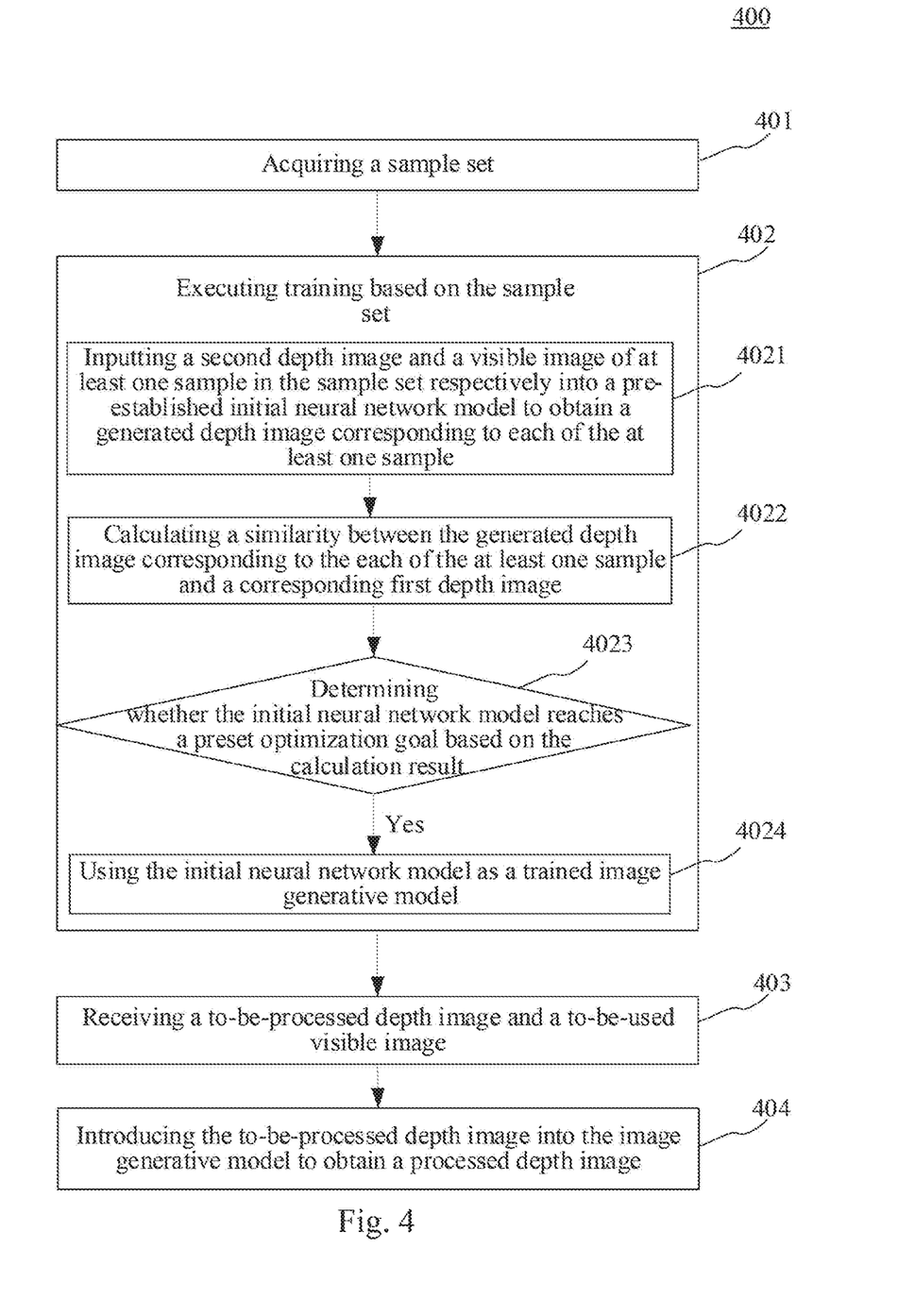
FIG. 4 is a process diagram of another embodiment of a method for generating an image generation model according to the disclosure.

Please further refer to FIG. 4, which shows a flow 400 of another embodiment of a method for generating an image generation model. The flow 400 of the method for generating an image generation model includes:

step 401: acquiring a sample set.

In the embodiment, an executive subject (e.g., the terminal devices 101, 102, 103, or the server 105 shown in FIG. 1) of the method for generating an image generative model can acquire a sample set. A sample in the sample set may include a first depth image, a second depth image, and a visible image. The first depth image, the second depth image, and the visible image include information of a given scenario. Here, the scenario may include a variety of photographing objects, such as human faces, human bodies, and objects. Image resolutions of the first depth image and the visible image are higher than a preset first resolution threshold, and an image resolution of the second depth image is lower than a preset second resolution threshold. Here, the visible image may be an RGB image. The first resolution threshold and the second resolution threshold may be set based on actual needs.

step 402: executing training based on the sample set.

In the embodiment, the executive subject can execute following training based on the sample set. The training may specifically include: step 4021: inputting a second depth image and a visible image of at least one sample in the sample set respectively into a pre-established initial neural network model to obtain a generated depth image corresponding to each of the at least one sample. step 4022: calculating a similarity between the generated depth image corresponding to the each of the at least one sample and a corresponding first depth image. step 4023: determining whether the initial neural network model reaches a preset optimization goal based on the calculation result. step 4024:

using the initial neural network model as a trained image generative model, in response to determining the initial neural network model reaching the preset optimization goal.

Relevant descriptions on the steps 2021, 2022, 2023, and 2024 in the embodiment corresponding to FIG. 2 may be referred to respectively for specific processing of the steps 4021, 4022, 4023, and 4024 in the embodiment and technical effects brought thereby, which are not repeated any more here.

step 403: receiving a to-be-processed depth image and a to-be-used visible image.

In the embodiment, the executive subject can receive a to-be-processed depth image and a to-be-used visible image. Here, the to-be-processed depth image and the to-be-used visible image may include information of a given scenario, an image resolution of the to-be-processed depth image is lower than the second resolution threshold, and an image resolution of the to-be-used visible image is higher than the first resolution threshold.

step 404: introducing the to-be-processed depth image into the image generative model to obtain a processed depth image.

In the embodiment, the executive subject can introduce the to-be-processed depth image into the image generative model to obtain a processed depth image. The image generative model is obtained by training, and can be used for characterizing a corresponding relationship between the depth image and the visible image and the generated depth image.

As can be seen from FIG. 4, compared with the embodiment corresponding to FIG. 2, the flow 400 of the method for generating an image generation model according to the embodiment highlights using the trained image generative model. Thus, the solution according to the embodiment can generate a high-resolution and high-quality depth image using the trained image generative model.

Figure 5:
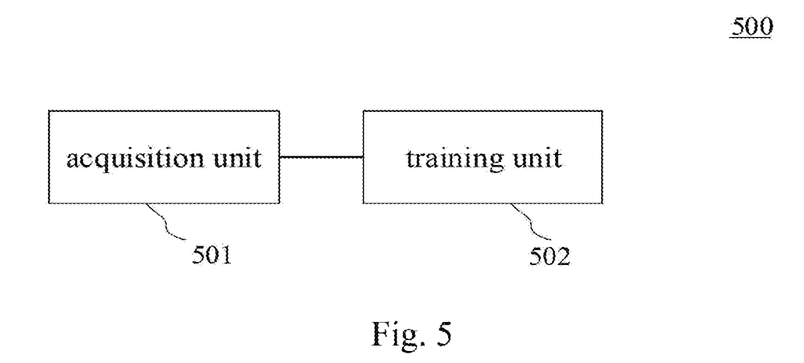
FIG. 5 is a schematic diagram of a structure of an embodiment of an apparatus for generating an image generation model according to the disclosure.

Please further refer to FIG. 5. As an implementation of the method shown in the above figures, the disclosure provides an embodiment of an apparatus for generating an image generative model. The embodiment of the apparatus corresponds to the embodiment of the method shown in FIG. 2. The apparatus may be specifically applied to a variety of electronic devices.

As shown in FIG. 5, an apparatus 500 for generating an image generation model according to an embodiment includes: an acquisition unit 501, and a training unit 502. The acquisition unit 501 is used for acquiring a sample set. A sample includes a first depth image, a second depth image, and a visible image. The first depth image, the second depth image, and the visible image include information of a given scenario. Image resolutions of the first depth image and the visible image are higher than a preset first resolution threshold, and an image resolution of the second depth image is lower than a preset second resolution threshold. The training unit 502 is used for executing following training based on the sample set: inputting a second depth image and a visible image of at least one sample in the sample set respectively into a pre-established initial neural network model to obtain a generated depth image corresponding to each of the at least one sample; calculating a similarity between the generated depth image corresponding to the each of the at least one sample and a corresponding first depth image; determining whether the initial neural network model reaches a preset optimization goal based on the calculation result; and using the initial neural network model as the trained image generative model, in response to determining the initial neural network model reaches the preset optimization goal.

Relevant descriptions on the steps 201, 202, 2021, 2022, 2023, and 2024 in the embodiment corresponding to FIG. 2 may be referred to respectively for specific processing of the acquisition unit 501, and the training unit 502 of the apparatus 500 for generating an image generative model in the embodiment and technical effects brought thereby, which are not repeated any more here.

In some optional implementations of the embodiment, the apparatus 500 may further include: an adjusting unit (not shown in the figure) for adjusting a model parameter of the initial neural network model, and forming a sample set including unused samples to continue executing the training, in response to determining the initial neural network model fails to reach the preset optimization goal.

In some optional implementations of the embodiment, the apparatus 500 may further include a sample generation unit (not shown in the figure). The sample generation unit may include: a depth image acquisition unit (not shown in the figure) for acquiring a first sample depth image of a sample scenario, where an image resolution of the first sample depth image is higher than the first resolution threshold; a processing unit (not shown in the figure) for processing the first sample depth image to obtain a second sample depth image, where an image resolution of the second sample depth image is lower than the second resolution threshold; a visible image acquisition unit (not shown in the figure) for acquiring a sample visible image of the sample scenario, where an image resolution of the sample visible image is higher than the first resolution threshold; and a storage unit (not shown in the figure) for storing associatively the first sample depth image, the second sample depth image, and the sample visible image as the sample in the sample set.

In some optional implementations of the embodiment, the depth image acquisition unit may be further used for: acquiring at least two visible images of the sample scenario collected by an image acquisition device from different angles, where an image resolution of a visible image in the at least two visible images is higher than the first resolution threshold; and obtaining the first sample depth image in the sample scenario based on the at least two visible images.

In some optional implementations of the embodiment, the apparatus 500 may further include: a receiving unit (not shown in the figure) for receiving a to-be-processed depth image and a to-be-used visible image, where the to-be-processed depth image and the to-be-used visible image include information of a given scenario, an image resolution of the to-be-processed depth image is lower than the second resolution threshold, and an image resolution of the to-be-used visible image is higher than the first resolution threshold; and an introduction unit (not shown in the figure) for introducing the to-be-processed depth image into the image generative model to obtain a processed depth image.

Figure 6:
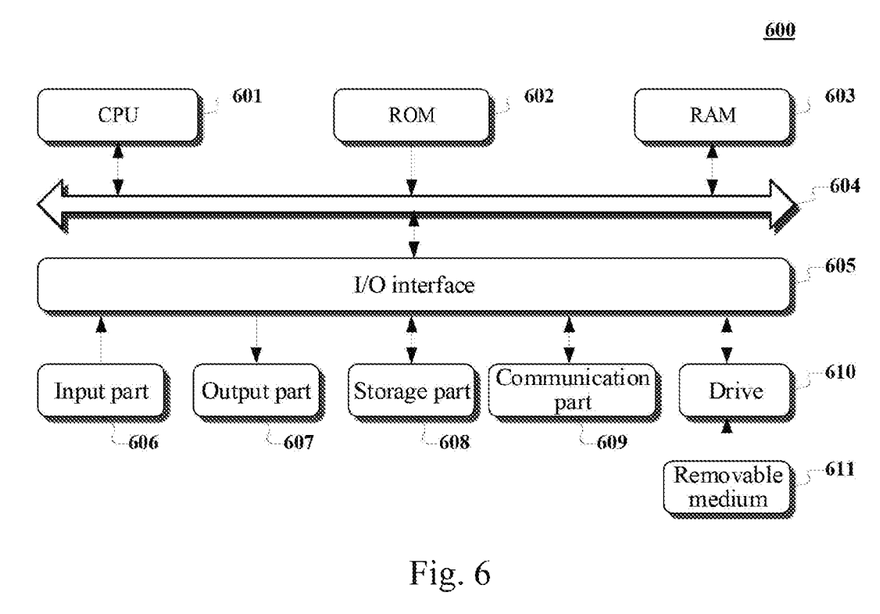
FIG. 6 is a schematic diagram of a structure of a computer system suitable for implementing a terminal device or a server according to an embodiment of the disclosure.

Referring to FIG. 6, a schematic structural diagram of a computer system 600 adapted to implement a terminal device or a server of the embodiments of the present disclosure is shown. The terminal device/server shown in FIG. 6 is merely an example and should not bring any limitation on the functionality or usage range of the embodiments of the preset disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of some embodiments of the present disclosure. It should be noted that the computer readable medium in some embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any physical medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, comprising an acquisition unit and a training unit, where the names of these units or modules do not in some cases constitute a limitation to such units or modules themselves. For example, the acquisition unit may also be described as "a unit for acquiring a sample set."

In another aspect, some embodiments of the present disclosure further provide a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: acquire a sample set, a sample including a first depth image, a second depth image and a visible image, the first depth image, the second depth image and the visible image including information of a given scenario, image resolutions of the first depth image and the visible image being higher than a preset first resolution threshold, an image resolution of the second depth image being lower than a preset second resolution threshold; and execute following training based on the sample set: input a second depth image and a visible image of at least one sample in the sample set respectively into a pre-established initial neural network model to obtain a generated depth image corresponding to each of the at least one sample; calculate a similarity between the generated depth image corresponding to the each of the at least one sample and a corresponding first depth image; determine whether the initial neural network model reaches a preset optimization goal based on the calculation result; and use the initial neural network model as a trained image generative model, in response to determining the initial neural network model reaches the preset optimization goal.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for generating an image generative model, comprising:
    acquiring a sample set, a sample comprising a first depth image, a second depth image and a visible image, the first depth image, the second depth image and the visible image including information of a given scenario, image resolutions of the first depth image and the visible image being higher than a preset first resolution threshold, an image resolution of the second depth image being lower than a preset second resolution threshold; and
    executing following training based on the sample set: inputting a second depth image and a visible image of at least one sample in the sample set respectively into a pre-established initial neural network model to obtain a generated depth image corresponding to each of the at least one sample; calculating a similarity between the generated depth image corresponding to the each of the at least one sample and a corresponding first depth image; determining whether the initial neural network model reaches a preset optimization goal based on the calculation result; and using the initial neural network model as a trained image generative model, in response to determining the initial neural network model reaches the preset optimization goal,
    wherein the method is performed by at least one hardware processor.

2. The method according to claim 1, further comprising:
    adjusting a model parameter of the initial neural network model, and forming a sample set including unused samples to continue executing the training, in response to determining the initial neural network model fails to reach the preset optimization goal.

3. The method according to claim 1, wherein samples in the sample set are obtained by following:
    acquiring a first sample depth image of a sample scenario, wherein an image resolution of the first sample depth image is higher than the first resolution threshold;
    processing the first sample depth image to obtain a second sample depth image, wherein an image resolution of the second sample depth image is lower than the second resolution threshold;
    acquiring a sample visible image of the sample scenario, wherein an image resolution of the sample visible image is higher than the first resolution threshold; and
    storing associatively the first sample depth image, the second sample depth image and the sample visible image as the sample in the sample set.

4. The method according to claim 3, wherein the acquiring a first sample depth image of a sample scenario comprises:
    acquiring at least two visible images of the sample scenario collected by an image acquisition device from different angles, wherein an image resolution of a visible image in the at least two visible images is higher than the first resolution threshold; and
    obtaining the first sample depth image of the sample scenario based on the at least two visible images.

5. The method according to claim 1, further comprising:
    receiving a to-be-processed depth image and a to-be-used visible image, wherein the to-be-processed depth image and the to-be-used visible image include information of a given scenario, an image resolution of the to-be-processed depth image is lower than the second resolution threshold, and an image resolution of the to-be-used visible image is higher than the first resolution threshold; and
    introducing the to-be-processed depth image into the image generative model to obtain a processed depth image.

6. An apparatus for generating an image generative model, comprising:
    at least one processor; and
    a memory storing instructions, the instructions when executed by the at least one processor, cause the at least one processor to perform operations, the operations comprising:
    acquiring a sample set, a sample comprising a first depth image, a second depth image and a visible image, the first depth image, the second depth image and the visible image including information of a given scenario, image resolutions of the first depth image and the visible image being higher than a preset first resolution threshold, an image resolution of the second depth image being lower than a preset second resolution threshold; and
    executing following training based on the sample set: inputting a second depth image and a visible image of at least one sample in the sample set respectively into a pre-established initial neural network model to obtain a generated depth image corresponding to each of the at least one sample; calculating a similarity between the generated depth image corresponding to the each of the at least one sample and a corresponding first depth image; determining whether the initial neural network model reaches a preset optimization goal based on the calculation result; and using the initial neural network model as a trained image generative model, in response to determining the initial neural network model reaches the preset optimization goal.

7. The apparatus according to claim 6, wherein the operations further comprise:
    adjusting a model parameter of the initial neural network model, and forming a sample set including unused samples to continue executing the training, in response to determining the initial neural network model fails to reach the preset optimization goal.

8. The apparatus according to claim 6, wherein samples in the sample set are obtained by following:
    acquiring a first sample depth image of a sample scenario, wherein an image resolution of the first sample depth image is higher than the first resolution threshold;
    processing the first sample depth image to obtain a second sample depth image, wherein an image resolution of the second sample depth image is lower than the second resolution threshold;
    acquiring a sample visible image of the sample scenario, wherein an image resolution of the sample visible image is higher than the first resolution threshold; and
    storing associatively the first sample depth image, the second sample depth image and the sample visible image as the sample in the sample set.

9. The apparatus according to claim 8, wherein the acquiring a first sample depth image of a sample scenario comprises:
    acquiring at least two visible images of the sample scenario collected by an image acquisition device from different angles, wherein an image resolution of a visible image in the at least two visible images is higher than the first resolution threshold; and
    obtaining the first sample depth image of the sample scenario based on the at least two visible images.

10. The apparatus according to claim 6, wherein the operations further comprise:
    receiving a to-be-processed depth image and a to-be-used visible image, wherein the to-be-processed depth image and the to-be-used visible image include information of a given scenario, an image resolution of the to-be-processed depth image is lower than the second resolution threshold, and an image resolution of the to-be-used visible image is higher than the first resolution threshold; and
    introducing the to-be-processed depth image into the image generative model to obtain a processed depth image.

11. A non-transitory computer readable storage medium storing a computer program, wherein the computer program, when executed by a processor, causes the processor to perform operations, the operations comprising:
    acquiring a sample set, a sample comprising a first depth image, a second depth image and a visible image, the first depth image, the second depth image and the visible image including information of a given scenario, image resolutions of the first depth image and the visible image being higher than a preset first resolution threshold, an image resolution of the second depth image being lower than a preset second resolution threshold; and
    executing following training based on the sample set: inputting a second depth image and a visible image of at least one sample in the sample set respectively into a pre-established initial neural network model to obtain a generated depth image corresponding to each of the at least one sample; calculating a similarity between the generated depth image corresponding to the each of the at least one sample and a corresponding first depth image; determining whether the initial neural network model reaches a preset optimization goal based on the calculation result; and using the initial neural network model as a trained image generative model, in response to determining the initial neural network model reaches the preset optimization goal.

* * * * *